April 24, 1934.  W. R. GRISWOLD  1,955,879
TRANSMISSION MECHANISM
Filed Oct. 16, 1930
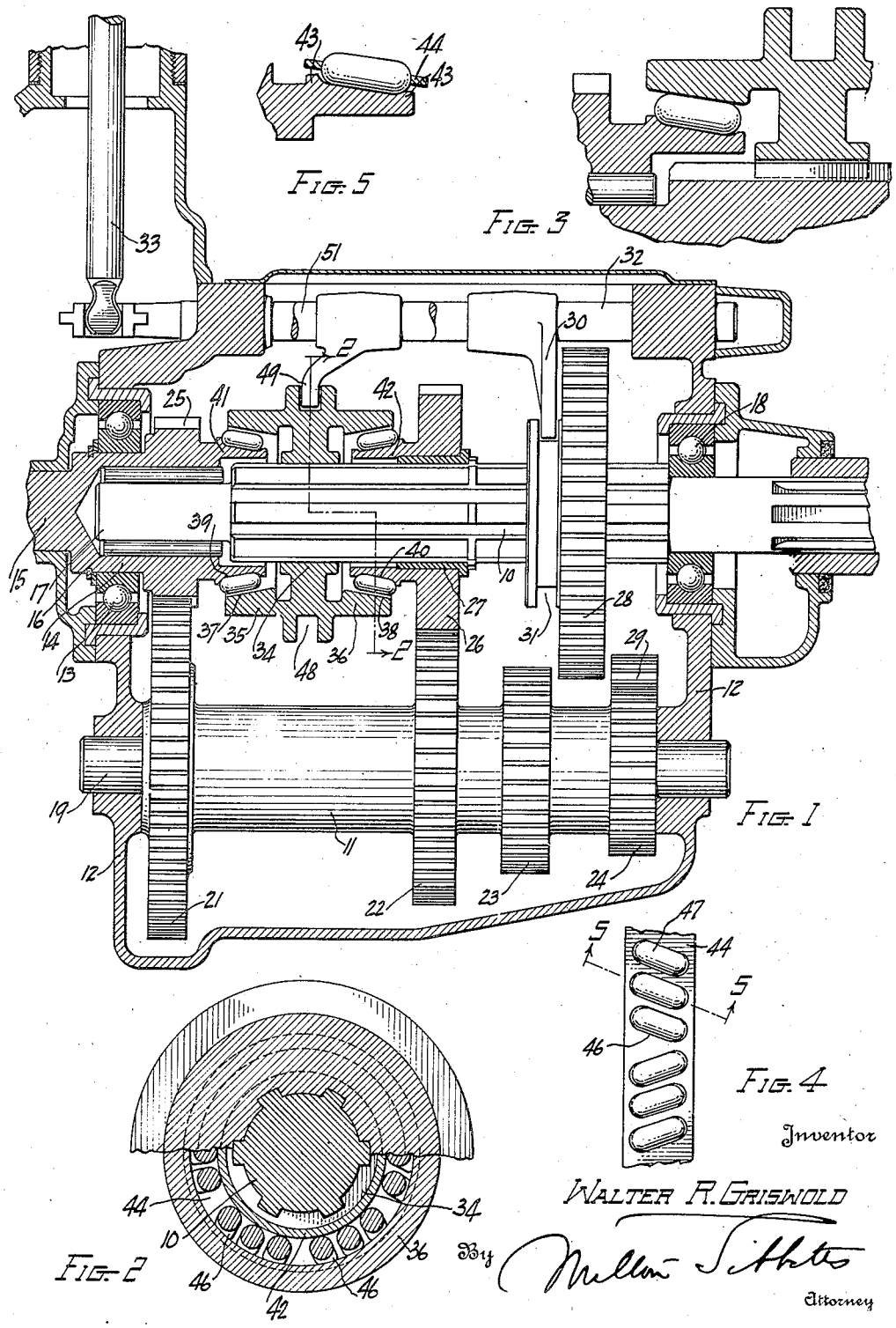
Inventor
WALTER R. GRISWOLD
By
Attorney Patented Apr. 24, 1934

1,955,879

UNITED STATES PATENT OFFICE 1,955,879

TRANSMISSION MECHANISM

Walter R. Griswold, Detroit, Mich., assignor to Packard Motor Car Company, Detroit, Mich., a corporation of Michigan Application October 16, 1930, Serial No. 489,089

7 Claims. (Cl. 192—48)

This invention relates to motor vehicles and more particularly to the transmission gearing of such vehicles.

In the operation of motor vehicles having conventional transmission gearing, after disconnection of the vehicle clutch and the previously meshed gears, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the exigencies of vehicle operation may dictate, so that gear changing has come to be considered as perhaps the most difficult task incident to the operation of a motor vehicle.

To assist the operator in making rapid and quiet gear changes it has been previously proposed to synchronize the gears to be meshed by various means, such as friction clutches. Such devices, however, have been open to certain objections. The mechanisms employed have been in general cumbersome and complicated, and the operating means subject to excessive wear.

One of the objects of this invention is to provide a motor vehicle transmission having an improved device for changing the gear ratio, which shall be simple and effective, and in which it is unnecessary to effect the meshing of gears or toothed elements rotating at different speeds.

Another object of the invention is to provide a motor vehicle transmission having a clutch device operable to synchronize and couple relatively rotatable members, which device shall be operable without shock or clash in either direction of relative rotation.

Another object of the invention is to provide apparatus of the character designated in which the connection between the driving and driven members shall be effected with a certain torsional yielding or twist so that the engagement shall be cushioned, and without regard to the relative rotation of the members.

A further object of the invention is to provide a motor vehicle transmission having gear trains of the constant mesh type with means for connecting the driven member to said trains in either direction of relative rotation.

Other objects of the invention will appear from the following description taken in connection with the drawing, which forms a part of this specification, and in which:

Fig. 1 is a view partially in side elevation and partially in longitudinal vertical section through a motor vehicle transmission embodying the present invention, the gear trains being shown in neutral position;

Fig. 2 is a section taken substantially on the line 2—2 of Fig. 1;

Fig. 3 is a fragmentary detail view of part of the device shown in Fig. 1 to a larger scale showing one of the clutches in engaged position, the cage being omitted.

Fig. 4 is a developed view of one of the clutch elements showing the arrangement of the clutch rollers in oppositely disposed sets in their cage, and Fig. 5 is a detailed section taken substantially on the line 5—5 of Fig. 4 but in position on the inner hub.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may also be driven from the gear 24 through a reverse idler pinion 29 in the well known manner. The sliding of gear 28 on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver in the well known manner.

Thus in the illustrated embodiment of the invention gear 28 may be moved to mesh with gear 23, to provide a first speed, or connected through pinions 29 to gear 24 to provide a reverse. Second speed is provided by connecting the constant mesh gear 26 to the shaft 10, and the third or high speed is secured by coupling the shafts 10 and 15, thus providing a direct drive.

To provide the second and high speed connections described, the forward portion of the shaft 10 is provided with a clutch device which is slidably secured to the shaft to rotate therewith between the gears 25 and 26. This constitues a splined hub 34, the splines of which cooperate with the splines of shaft 10, having axially extending portions 35 and 36 on which are formed conoidal wedge surfaces 37 and 38 respectively. These surfaces are arranged to overhang similarly inclined surfaces 39 and 40, which are formed respectively on extensions 41 and 42 on the end of the shaft portion 14 and on the body of gear 26. The circumferential edges of these surfaces are provided with end flanges or stops 43, as clearly shown in Fig. 5. Between each of the pairs of cooperating conoidal surfaces is arranged a roller clutch element which is preferably of the skewed roller type such as is shown and described for example, in the United States Patent 1,670,197 to Humfrey. This includes a suitable race or cage 44 having slots 46 inclined to the direction of rotation of the race, as shown in Figs. 2, 4 and 5, the race being omitted from the other figures in the interest of clarity. A roller 47, which may be cylindrical is disposed in each of the slots 46 between the surfaces, as the surfaces 37 and 39, with its axis skewed by reason of inclination of the slot to the axis of the cone. The rollers are provided with spherical ends and the cooperating slots are similar in shape but slightly longer than the rollers so as to permit a play of each roller in the direction of its own axis between the stop flanges 43. This arrangement constitutes a well known type of roller clutch, in which each of the rollers is wedged between and connects the conoidal surfaces in one direction of relative rotation, and releases these surfaces in the other direction, depending on the direction in which the roller axes are inclined.

In the present embodiment the rollers 47 are arranged in groups of which the roller axes are inclined in the same direction, the roller axes of alternate groups being inclined in opposite directions. As clearly shown in Fig. 4 each of these clutch devices constitutes a connection between the member 34 and its associated driving gear which will transmit torque between the associated elements in either direction, that is regardless of which of the rotary elements will overrun the other.

Engagement of either clutch device is secured by sliding the hub member 34 in that direction to bring the surfaces 37, or the surfaces 38 as desired, into contact with the associated roller assembly. For this purpose the hub 34 is provided with a shifter groove 48, in which a fork 49 similar to the fork 30 is engaged. The fork 49 is actuated by a shifter rod 51 which may be selectively engaged by the gear lever 33.

The operation of this device will be clearly understood from the foregoing description. If the gear trains are in neutral as illustrated in Fig. 1 and it is desired to place the vehicle in high gear the shift lever is manipulated to move the hub 34 forwardly or toward the left. This brings the conoidal surface 37 on the extension 35 into operative contact with the rollers of the clutch device connected to the end of the drive shaft 15. If, as is usually the case, the shaft 15 is at rest or moving very slowly, and the shaft 10 is being driven by reason of the motion of the vehicle at a higher speed, the rollers 47 in those sets which are inclined in the right direction will be drawn into locking engagement between the surfaces 37 and 39, thus connecting the shafts 15 and 10 to provide direct drive or high gear. If, on the other hand, the shaft 15 is overrunning the shaft 10 for any reason, the action will be the same except that the rollers of the other sets will be actuated to effect engagement of the clutch devices and connection between the shafts. In the same way movement of the hub 34 rearwardly or to the right will connect one or the other of the sets of rollers in the right hand clutch device between the surfaces 38 and 40.

The functioning of the individual rollers of the set which is being engaged is the same as the functioning of the individual rollers in the complete clutch shown in the above mentioned Humfrey patent in which the engaging rollers extend all the way around the conoidal surfaces. In the present invention, while the groups of rollers extending in a similar angular relation are being engaged, the other groups of rollers, which are inclined in the opposite direction, are functioning as the Humfrey unit would function during a transition from positive drive to a free wheeling drive. That is to say, the individual rollers of the groups extending in one direction are, due to their angle of inclination and the relative direction of rotation of the adjacent conoidal surfaces, being rolled and slid axially to a location in which the conoidal surfaces are further apart and consequently no wedging or driving action can take place through these rollers when the groups of rollers extending in the other direction are wedged in driving relation.

It will be evident that this device provides a simple and effective connection of a selective nature, by means of which the driving gear train may be readily shifted without clash or damage, and without the necessity for double clutching or the performance of any other difficult maneuvers. Each of the clutch devices has a certain amount of give or yielding in a torsional sense which enables the selected gear train to be picked up without shock, acting in this way as a synchronizing device whereby the parts to be connected are brought approximately to synchronous speed before the connection is made positive. Thus the invention provides means for cushioning the engagement of the relative rotatable members.

It will also be seen that this device permits free wheeling of the vehicle with the gears in neutral. Such free wheeling may be obtained by the simple expedient of moving the gear lever 33 into neutral position. To reengage the vehicle in gear it is only necessary to disconnect the main clutch of the vehicle, shift the lever 33 to engage the roller clutch device which corresponds to the desired gear train, and then re-engage the main vehicle clutch. In this way the vehicle may be simply and surely brought under control if it has been coasting in neutral even though it may have acquired considerable velocity during the coast. It will also be understood that while this invention is described in connection with conventional high and second speed gear trains of a transmission, it may also be applied to the lower speeds and to the reverse gearing thereof, and may be used as well on four speed transmissions as on the conventional device herein described.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a motor vehicle transmission having a driving member and a driven member, a clutch device comprising an element associated with each of said members, said elements each having a conoidal surface arranged in co-operating relation, and opposite one-way driving means between said conoidal surfaces, each of said means being adapted automatically to move out of driving position upon engagement of the other of said means while the clutch device is applied.

2. In a transmission mechanism, a clutch device comprising a pair of elements adapted to be engaged in a two way driving relation, said elements each having a conoidal surface, said surfaces being arranged in co-operating relation and opposite one-way driving means disposed between said two surfaces and adapted to connect said elements in driving relation, each of said means automatically moving out of driving position upon engagement of the other of said means in driving relation while the clutch device is applied.

3. In a motor vehicle transmission having a pair of rotatable members, clutch means for connecting said members in two-way driving relation, comprising an element slidably mounted in driving relation on one of said members, a co-operating element fixed to the other of said members, each of said elements having a conoidal surface thereon, said two surfaces being related to co-operate upon sliding of said element, and separate one-way driving means disposed between said surfaces and adapted to engage the members in two-way driving relation, said surfaces being adapted to control said driving means to cause engagement of only one of said means at a time.

4. In a clutch, rotatable elements each having a conoidal surface, said surfaces being associated in spaced telescopic relation and cylindrical rollers between and engageable with said surfaces in driving relation, said rollers being arranged in groups extending alternately in opposite angular relation.

5. In a transmission mechanism, a pair of rotatable members, one of said members having a conoidal surface fixed thereto and the other member having an axially shiftable conoidal surface adapted to telescope the fixed surface, a plurality of rollers between the surfaces arranged in groups extending alternately in different angular relation, and a recessed cage member for the rollers, the recesses in said cage member being of a length to permit a limited axial movement of the rollers therein.

6. In a transmission mechanism, a pair of rotatable members, one of said members having a conoidal surface fixed thereto and the other member having an axially shiftable conoidal surface adapted to telescope the fixed surface, a plurality of rollers between the surfaces arranged in groups extending in two different angular relations, and means for retaining the rollers in spaced relation circumferentially, said rollers having a small axial movement with respect to the retaining means.

7. In a clutch structure, the combination of a pair of spaced elements having conoidal surfaces adapted to be telescopically associated, and rolling members adapted to be engaged between said surfaces, some of said rolling members being arranged to extend in an opposite angular relation relative to other of the rolling members to establish a driving relation from either element to the other element.

WALTER R. GRISWOLD.